US009260088B2

(12) United States Patent
Shand et al.

(10) Patent No.: US 9,260,088 B2
(45) Date of Patent: Feb. 16, 2016

(54) HYBRID BRAKE PEDAL FEEL SYSTEM

(71) Applicant: FORD GLOBAL TECHNOLOGIES, LLC, Dearborn, MI (US)

(72) Inventors: Mark Allen Shand, Brighton, MI (US); Robert E. Stewart, Farmington Hills, MI (US); Nicholas Strumbos, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 55 days.

(21) Appl. No.: 14/055,116

(22) Filed: Oct. 16, 2013

(65) Prior Publication Data

US 2015/0101446 A1    Apr. 16, 2015

(51) Int. Cl.
G05G 1/30 (2008.04)
B60T 7/04 (2006.01)
G05G 1/40 (2008.04)

(52) U.S. Cl.
CPC .. B60T 7/042 (2013.01); G05G 1/40 (2013.01)

(58) Field of Classification Search
CPC ................................. G05G 1/30; G05G 1/38
USPC .................................... 74/478, 512–514, 560
See application file for complete search history.

(56) References Cited

U.S. PATENT DOCUMENTS

| 3,766,802 | A  | * | 10/1973 | Shellhause | ....................... 74/512 |
| 6,230,581 | B1 |   | 5/2001  | Popowich   | |
| 6,294,029 | B1 | * | 9/2001  | Sakate et al. | .................. 148/211 |
| 6,802,232 | B2 |   | 10/2004 | Buckley et al. | |
| 7,128,376 | B2 |   | 10/2006 | Williams et al. | |
| 7,156,061 | B2 | * | 1/2007  | Matsui et al. | ............... 123/90.51 |
| 7,568,407 | B2 | * | 8/2009  | Kim et al. | ........................ 74/512 |
| 8,220,865 | B2 | * | 7/2012  | Brunner   | ..................... 296/187.1 |
| 8,474,348 | B2 | * | 7/2013  | Soltys et al. | ..................... 74/512 |
| 8,806,976 | B2 | * | 8/2014  | Soltys et al. | ..................... 74/512 |
| 2005/0043137 | A1 | * | 2/2005 | Shinoda | .......................... 476/40 |
| 2011/0041647 | A1 | * | 2/2011 | Soltys  | .............................. 74/560 |
| 2015/0107402 | A1 | * | 4/2015 | Leem    | .............................. 74/512 |

FOREIGN PATENT DOCUMENTS

| DE | 2648816 A1 | * | 5/1987 |
| FR | 2887837 A1 |   | 1/2007 |
| WO | 2011094332 A2 | | 8/2011 |

OTHER PUBLICATIONS

"The Hybrid Brake Pedal", http://www.zf.com/corporate/en/products/product_range/cars/lightweightdesign_1/hybridbrakepedal_1/hybrid_brake_pedal_1.html.
Enlighten, "Trelleborg Develops Hybrid Brake Pedal that's 50 Percent Lighter than Traditional Metal", Monday, Nov. 7, 2011, http://altairenlighten.com/2011/11/trelleborg-develops-hybrid-brake-pedal-thats-50-precent-lighter-than-traditional-metal/.

* cited by examiner

*Primary Examiner* — Adam D Rogers
(74) *Attorney, Agent, or Firm* — Raymond L. Coppiellie; Brooks Kushman P.C.

(57) ABSTRACT

A brake pedal assembly for a hybrid electric vehicle having a brake pedal arm and a cam follower extending from the brake pedal arm is provided. The cam follower is configured to cooperate with a stamp bracket having a cam surface to provide brake pedal feel resistance as the brake pedal arm is actuated by a user of the hybrid electric vehicle. This brake pedal feel resistance increases as the cam follower traverses along the cam surface of the stamp bracket.

9 Claims, 4 Drawing Sheets

HYBRID BRAKE PEDAL FEEL SYSTEM

TECHNICAL FIELD

The present disclosure relates to brake pedal systems, specifically to brake-by-wire brake pedal systems.

BACKGROUND

Brake systems in an automobile typically include hydraulically actuated wheel brakes, a master cylinder and a brake pedal assembly connected to the master cylinder via a brake booster. As an operator actuates the brake pedal assembly the brake booster/master cylinder is activated and fluid pressure is sent to the wheel brakes, such as calipers or drum brakes, which in turn applies frictional force to rotors or drums, respectively. The activation of the brake booster/master cylinder is resisted or opposed by a force attributable to fluid pressure in the hydraulic fluid channels and the brake pads or linings pressing against the rotors or drums. This resistive or opposing force increases relative to the movement of the brake pedal assembly as additional braking force is applied to the wheel brakes. Motor vehicle operators perceive this relationship between movement of the brake pedal assembly and increasing resistive force as "pedal feel" of the brake system. Drivers expect this "pedal feel" from all motor vehicle brake systems. In a motor vehicle brake system in which fluid pressure to apply a wheel brake is created independently of a direct mechanical connection between the brake pedal and the brake booster/master cylinder, i.e. a "brake-by-wire" brake system, this "pedal feel" may not be felt by the operator. Therefore it may be advantageous to provide a similar "pedal feel" of a traditional brake system in a "brake-by-wire: brake system.

SUMMARY

In one aspect of the present disclosure a brake pedal assembly for a hybrid electric vehicle is provided having a brake pedal arm and a cam follower extending from the brake pedal arm. The cam follower is configured to cooperate with a stamp bracket having a cam surface to provide brake pedal feel resistance as the brake pedal arm is actuated by a user of the hybrid electric vehicle. This brake pedal feel resistance increases as the cam follower traverses along the cam surface of the stamp bracket.

The cam surface of the brake pedal assembly for a hybrid electric vehicle may be heat treated to a hardness of HV 400 to HV 550 to a depth of 0.3 mm to 0.5 mm. The cam surface may have a surface roughness Ra value of 0.3 micrometers or less, without having to undergo an additional machining process. Additionally, the cam surface may have a concave region and a convex region sharing a continuous surface finish free of machine marks and imperfections which may be felt by a user when depressing the brake pedal arm.

In another aspect of the present disclosure, a brake pedal feel simulator capable of providing pedal feel for a brake pedal assembly is provided. The brake pedal feel simulator is provided with a base portion mountable to a brake pedal assembly. The brake pedal feel simulator is further provided with a projecting portion stamped with a concave-convex roller travel surface configured to cooperate with a cam follower to provide a pedal feel for the brake pedal assembly as the brake pedal assembly is depressed by an operator of the vehicle.

The brake pedal feel simulator may have a projecting portion with a substantially u-shaped cross section having a first sidewall and second sidewall extending from the concave-convex roller travel surface. The brake pedal feel simulator may have a base portion having a cantilevered reinforcement flange, providing support for the concave-convex roller travel surface. The brake pedal feel simulator may be provided with a weld nut capable of accepting an upstop bolt which is capable of setting a brake pedal assembly maximum release point. The brake pedal feel simulator may also be provided with a downstop feature on each of the first sidewall and second sidewall, where the downstop feature is configured to set a brake pedal assembly maximum travel point.

Embodiments according to the present disclosure provide various advantages. For example, various aspects simulate the expected feel of a traditional brake pedal in a braking system that has brake-by-wire capability. In such a brake-by-wire system, as a brake pedal is depressed by an operator the fluid pressure used to apply a wheel brake is created by an electro-hydraulic apparatus instead of a direct linkage between the brake pedal and the brake booster.

The above advantages and other advantages and features will be readily apparent from the following detailed description of the preferred embodiments when taken in connection with the accompanying drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
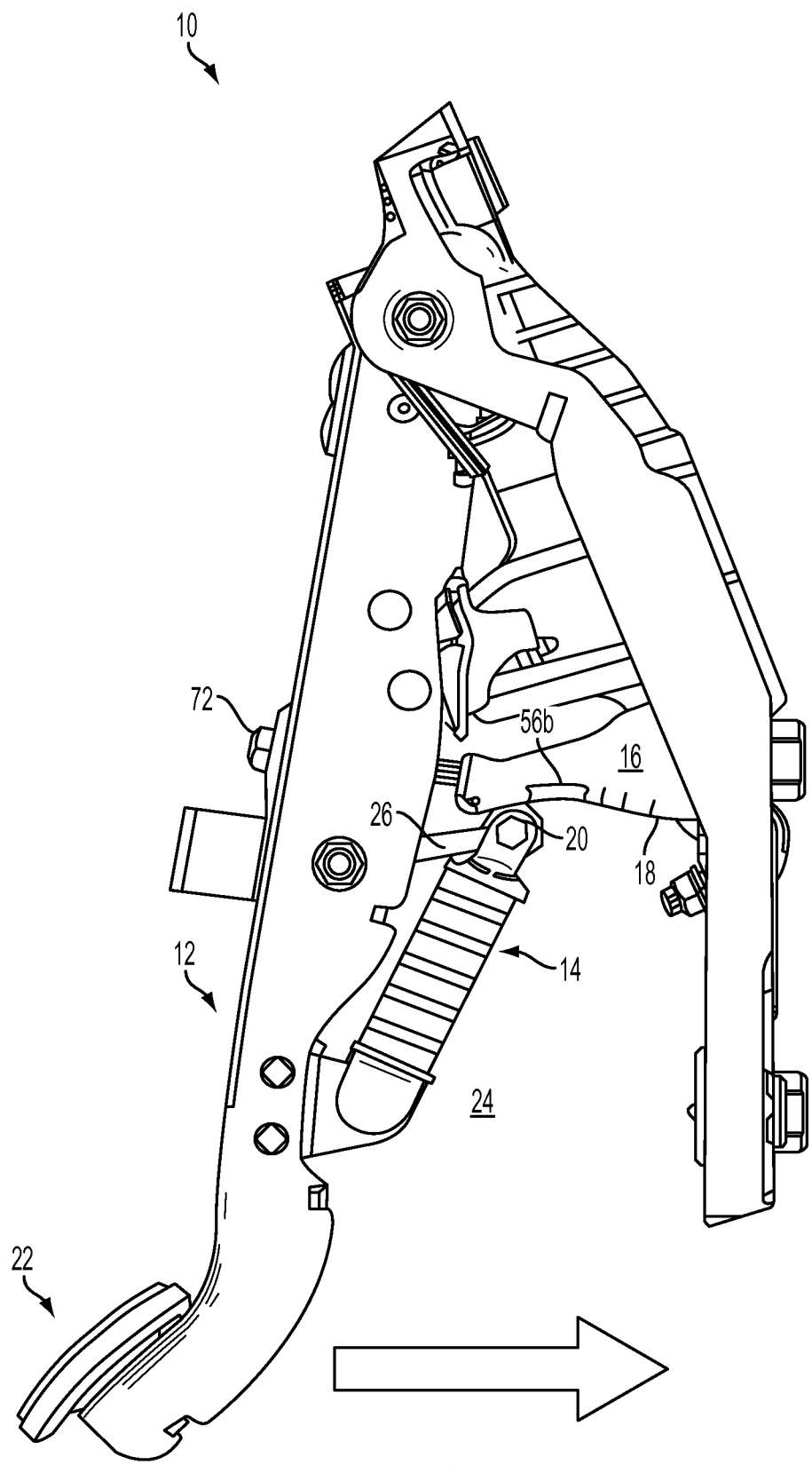
FIG. 1 is a side view of a brake pedal assembly with a stamped bracket providing a cam surface for brake pedal feel.

FIG. 1 shows a brake pedal assembly 10 for use in vehicles that provide for a decoupled mechanical link from the brake pedal assembly 10 to the brakes on the vehicle (not shown). Brake pedal assembly 10 uses a position sensor (not shown) to monitoring the position of a brake pedal arm 12 pivotally connected to the brake pedal assembly 10. A brake system controller may be in communication with the position sensor and use the position data to appropriately apply braking forces at the wheels through electronic actuators. These brake-by-wire systems are desirable in that they may disconnect a direct mechanical link from the wheels and brakes on the vehicle and the brake pedal assembly 10, and as such inhibit the transfer of noise, vibration, and harshness from the road, and/or interaction of the braking pads and rotors, to a driver through the brake pedal arm 12. The brake pedal assembly 10 is particularly adapted for use in an electric vehicle or hybrid vehicle, in which varying portions of the braking energy may be used for regenerative braking, while maintaining the same brake pedal arm 12 pivot angles to vehicle deceleration regardless of the regenerative/frictional split.

To provide a driver with a similar pedal feel for vehicle deceleration, regardless of the regenerative/frictional split of the braking system, the brake pedal arm 12 may be have a cam follower 14 extending therefrom in cooperation with a stamped bracket 16 having a cam surface 18 providing a brake pedal simulator for mimicking the pedal feel of a traditional brake pedal. The cam follower 14 may be pivotally connected to the brake pedal arm 12 and may have a roller wheel 20 in contact with the cam surface 18. As a user depresses the brake pedal pad 22, the cam follower 14 travels along the cam surface 18 provided by the stamped bracket 16, and the pedal feel resistance increases which effectively simulates the feel of a traditional brake pedal where fluid pressure to apply a wheel brake would be created directly by a user actuating the brake master cylinder by a linkage with a brake pedal arm. The cam follower may have a spring link 24 rotatably connected to the brake pedal arm 12 and a locating link 26 rotatably connected to the brake pedal arm 12 and the spring link 24 to position the roller wheel 20 on the cam surface enhancing the force feedback and providing for a more realistic pedal feel as the brake pedal arm moves through its full pivot motion during a vehicle stop.

Figure 2:
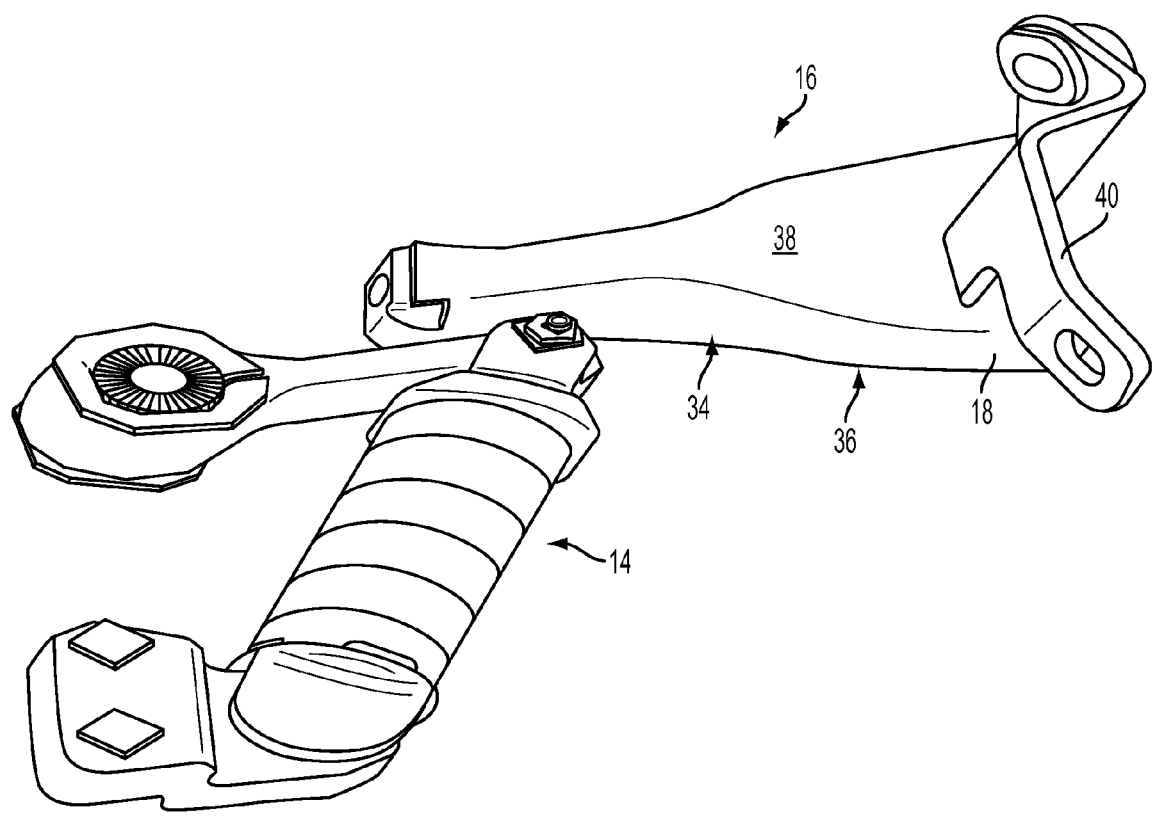
FIG. 2 is a bottom isometric view of a brake pedal feel simulator having a stamped roller travel surface and a cam follower.

Referring to FIG. 2, the stamped bracket 16 is shown with a stamped cam surface 18 having a concave region 34 and a convex region 36. The cam surface 18 may act as a roller travel surface or support surface for the cam follower 14. As the cam follower 14 travels along the cam surface 18, the cam follower 14 traverses along the concave region 20, providing a first pedal feel force or range of forces as a function of the concave surface profile. As the cam follower 14 continues to travel along the cam surface 18, the cam follower 14 transitions from the concave region 20 to the convex region 22, the convex region 32 providing a second pedal feel force or range of forces as a function of the convex surface profile. The second pedal feel force or range of forces may increase at an exponential rate as the user further depresses the brake pedal pad 22 (see FIG. 1).

The concave and convex regions 34, 36 may be formed by a stamping process such as coining. The stamping process is controlled to provide a continuous surface finish throughout the cam surface's concave and convex regions 34, 36, eliminating or minimizing any surface roughness due to material surface graining or material stretch as a result of the stamping process. The stamped cam surface 18 is generally free of machine marks or surface imperfections to a degree that may be felt by a user when depressing the brake pedal arm 12. Other alternatives to achieve a surface free of machine marks or surface imperfections tend to be more complex and require multiple machining processes. The stamping process utilized in the present disclosure is a more cost effective and simpler process as compared to other machining processes capable of providing a similar surface finish. The stamping process used here is controlled to provide a cam surface 18 with a surface roughness or surface roughness profile (Ra value) of 0.3 micrometers or less.

The cam surface 18 may also undergo a heat treatment process to carburize and harden the cam surface 18. The surface hardness ensures that the cam surface 18 is extremely resistant to wear and has a long service life without danger of cracks or fracture. The surface hardness may be within a range of 400 HV to 550 HV to a depth of 0.3 mm to 0.5 mm. The Vickers hardness may be determined independent of the size of the indenter. As one skilled in the art is well aware, the load and duration of load application is determined by the material being tested and the standard testing method employed. ASTM E384-11e1 is commonly employed to determine surface hardness.

The stamped bracket 16 may be formed having a projecting portion 38 connected to and extending outwardly from a base portion 40. The base portion 40 of the stamped bracket 16 may be mounted to a non-pivoting portion of the brake pedal assembly 10 relative to the brake pedal arm 12. The base portion 40 may also be mounted directly to the vehicle in a fixed location capable of providing resistance to the pivoting motion of the brake pedal arm 12. The projecting portion 38 may be joined to the base portion 40 by a welding process. In the alternative, the stamped bracket 16 may only have a projecting portion 38, and the projecting portion 38 may be mounted to the brake pedal assembly 10 or directly to the vehicle in a location that may effectively resist the brake pedal arm 12 pivoting.

Figure 3:
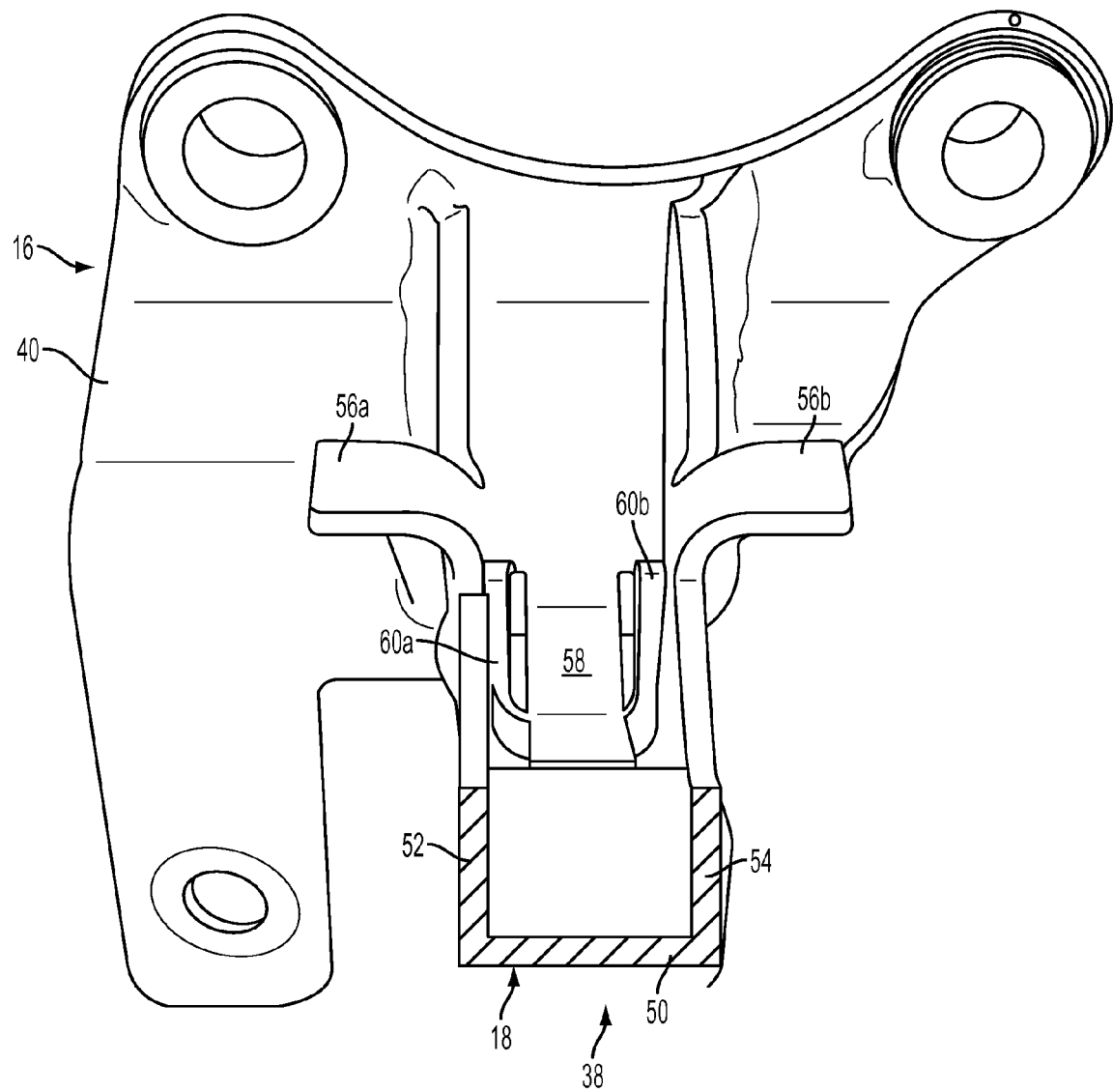
FIG. 3 is a front cross-sectional view of a stamped bracket.

Referring to FIG. 3, a front cross-sectional view of the stamped bracket 16 is shown with the cross-section taken through the projecting portion 38 and the view looking at the projecting portion 38 with the base portion 40 directly behind it. The projecting portion 38 may have a center section 50 providing the cam surface 18 and first sidewall 52 and second sidewall 54 extending generally perpendicularly from the center section 50 such that the first and second sidewalls 52, 54 are generally opposing sidewalls 52, 54. The term generally when applied here means that the first and second sidewalls 52, 54 do not extend exactly at 90 degree angles from the center section 50, but rather they could extend at acute or obtuse angles from the center section 50 ranging from 45 degrees to 135 degrees and still be considered generally perpendicular and generally opposing. The combination of the center section 50 and first and second sidewall sections, 52, 54 form a substantially u-shaped cross section. The first and second sidewalls 52, 54 extend from and provide support for the roller travel surface of the cam surface 18.

The sidewalls 52, 54 of the projecting portion 38 may each be provided with a stop or downstop 56a, 56b capable of limiting the maximum downward travel of the brake pedal arm 12. The downstop 56a, 56b acts as a hard stop for the brake pedal arm 12, with which the brake pedal arm 12 can no longer pivot forward (see FIG. 1). The downstop 56a, 56b sets a maximum travel point, or pivot, for the brake pedal arm 12 and the brake pedal assembly 10. A single downstop or multiple downstops 56a, 56b may be provided, and may be located on other components of the brake pedal assembly 10.

The base portion 40 may be formed with a reinforcement flange 58 that is disposed on the underside of the center section 50 and between the first and second sidewall sections, 52, 54. The reinforcement flange 58 may be a cantilevered reinforcement flange 58. The reinforcement flange 58 may have connection tabs 60a, 60b extending generally parallel and joined to the first and second opposing sidewalls 52, 54 by a puddle weld or fastener. The reinforcement flange 58 may be disposed adjacent to the center section 50 opposite the cam surface 18 and between the first and second sidewalls 52, 54 providing additional support to the surface.

Figure 4:
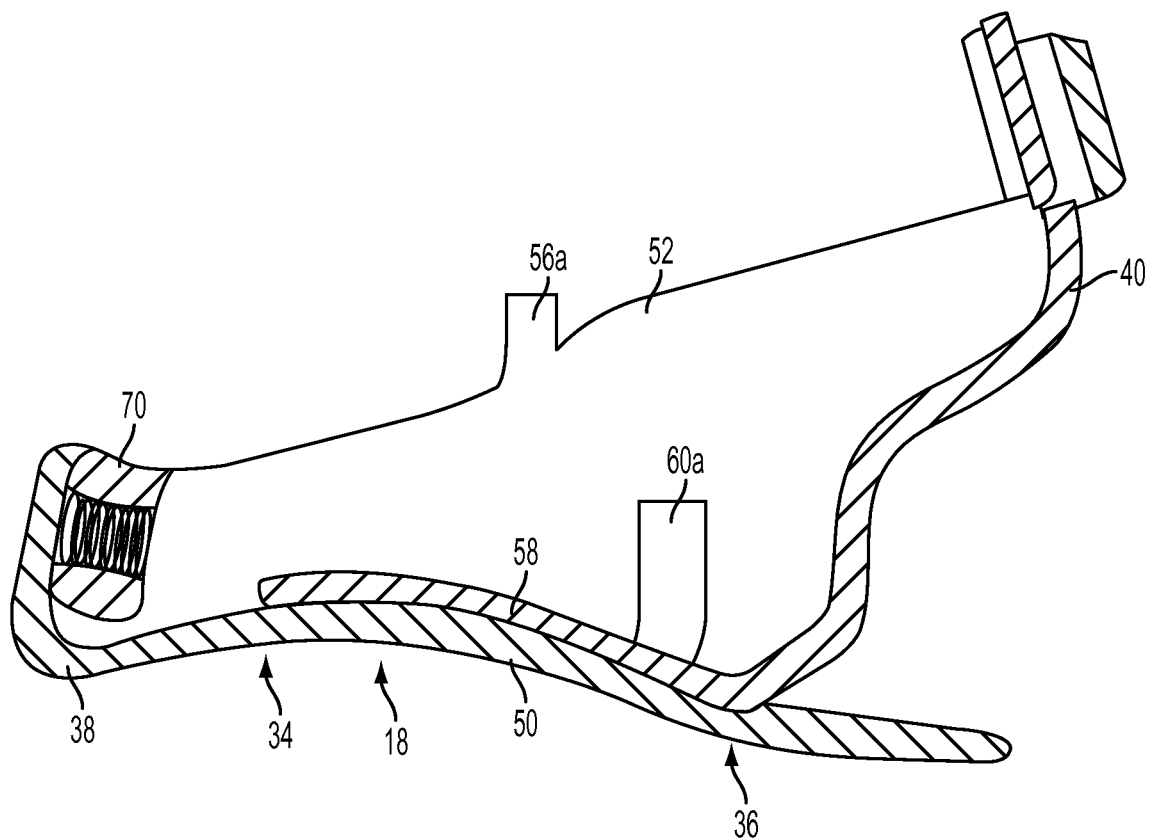
FIG. 4 is a side cross-sectional view of a stamped bracket.

Referring to FIG. 4, a side cross-sectional view of the stamped bracket is shown. The reinforcement flange 58 may be placed at a high load area along the cam surface 18 to assist the stamped bracket in withstanding highly localized loads as the cam follower 14 transitions from the concave region 34 to the convex region 36. The reinforcement flange 58 may be shaped to follow the contour of the underside of the cam surface 18 of the stamping. The reinforcement flange 58 may allow for a thinner material thickness of the projecting portion 38 with an enhanced localized area able to withstand greater loads. The reinforcement flange 58 is shown contacting the underside of the concave-convex roller travel surface 34, 36 and is shown affixed to the first sidewall 52 by connecting tab 60a. The flange 58 may also be connected to the second sidewall 54 by connecting tab 60b (see FIG. 3)

A weld nut 70 may be disposed on a leading section of the projecting portion 38. The weld nut 70 may be configured to receive an upstop bolt 72 (shown in FIG. 1), which is configured to cooperate with the brake pedal arm 12 to set a brake pedal assembly maximum release point. The upstop bolt 72 permits a user, a dealer, or a manufacturer to adjust the maximum release point of the brake pedal assembly.

The projecting portion 38 may be made of 1018 steel having a thickness of 2.5-3.0 mm. 1018 steel is able to be formed without excessive thinning while possessing superior strength, toughness and durability as compared to other high carbon steels such as 1008 and 1010 steel. The projecting portion 38 and base portion 34 in combination with the cam follower 14 and other components described above cooperate to form a brake pedal feel simulator.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A brake pedal feel simulator comprising:
    a base portion mountable to a brake pedal assembly having a cantilevered flange; and
    a stamped projecting portion affixed to the base portion having
        a concave-convex roller travel surface, and
        a first sidewall and a second sidewall extending from the concave-convex roller travel surface,
    wherein the cantilevered flange contacts an underside of the concave-convex roller travel surface and is affixed to the first sidewall and second sidewall.

2. The brake pedal feel simulator of claim 1 wherein the concave-convex roller travel surface is configured to provide an increasing brake pedal resistive force as the brake pedal assembly is actuated and a cam follower moves along the concave-convex roller travel surface.

3. The brake pedal feel simulator of claim 1 wherein the projecting portion has a substantially u-shaped cross section defined by the first sidewall, second sidewall, and the concave-convex roller travel surface.

4. The brake pedal feel simulator of claim 3 wherein the projecting portion is provided with a weld nut capable of accepting an upstop bolt capable of setting a brake pedal assembly maximum release point.

5. The brake pedal feel simulator of claim 4 wherein the first sidewall and second sidewall each have a downstop feature configured to set a brake pedal assembly maximum travel point.

6. The brake pedal feel simulator of claim 1 wherein the projecting portion is made of 1018 steel.

7. The brake pedal feel simulator of claim 1 wherein the projecting portion has a material thickness of 2.5 mm to 3.0 mm.

8. The brake pedal feel simulator of claim 1 wherein the concave-convex roller travel surface is hardened to a depth of 0.3 mm to 0.5 mm.

9. The brake pedal feel simulator of claim 1 wherein the concave-convex roller travel surface has a surface hardness of 400 HV to 550 HV.

* * * * *